(12) United States Patent
Ple

(10) Patent No.: US 8,205,201 B2
(45) Date of Patent: Jun. 19, 2012

(54) PROCESS FOR MAINTAINING EXECUTION SYNCHRONIZATION BETWEEN SEVERAL ASYNCHRONOUS PROCESSORS WORKING IN PARALLEL AND IN A REDUNDANT MANNER

(75) Inventor: Christophe Ple, Perthes (FR)

(73) Assignee: Thales (FR)

( * ) Notice: Subject to any disclaimer, the term of this patent is extended or adjusted under 35 U.S.C. 154(b) by 1130 days.

(21) Appl. No.: 12/030,461

(22) Filed: Feb. 13, 2008

(65) Prior Publication Data
US 2008/0196037 A1    Aug. 14, 2008

(30) Foreign Application Priority Data

Feb. 13, 2007 (FR) ...................................... 07 01033

(51) Int. Cl.
G06F 9/46 (2006.01)
G06F 15/00 (2006.01)

(52) U.S. Cl. .......... 718/102; 718/107; 718/108; 712/29; 712/30; 712/227

(58) Field of Classification Search ................. 718/107, 718/102
See application file for complete search history.

(56) References Cited

U.S. PATENT DOCUMENTS

| | | | |
|---|---|---|---|
| 5,226,152 A * | 7/1993 | Klug et al. | 714/12 |
| 5,317,726 A * | 5/1994 | Horst | 714/12 |
| 5,339,404 A * | 8/1994 | Vandling, III | 714/1 |
| 5,600,784 A * | 2/1997 | Bissett et al. | 714/12 |
| 5,615,403 A * | 3/1997 | Bissett et al. | 710/61 |
| 5,790,397 A * | 8/1998 | Bissett et al. | 700/2 |
| 5,896,523 A | 4/1999 | Bissett et al. | |
| 6,223,304 B1 * | 4/2001 | Kling et al. | 714/12 |
| 6,240,526 B1 * | 5/2001 | Petivan et al. | 714/11 |
| 6,374,364 B1 | 4/2002 | McElroy et al. | |
| 6,928,583 B2 * | 8/2005 | Griffin et al. | 714/11 |
| 7,426,656 B2 * | 9/2008 | Bernick et al. | 714/12 |

FOREIGN PATENT DOCUMENTS

| | | |
|---|---|---|
| EP | 1 283 468 | 2/2003 |
| EP | 1 380 953 | 1/2004 |
| EP | 1 398 701 | 3/2004 |

OTHER PUBLICATIONS

Abstract of DE10133652 as an English Abstract for EP1283468 from which EP1283468 claims priority.

* cited by examiner

*Primary Examiner* — Jennifer To
(74) *Attorney, Agent, or Firm* — Lowe Hauptman Ham & Berner, LLP

(57) ABSTRACT

A process for maintaining synchronization of processors that are executing a same plurality of applications in parallel includes interrupting a current task between processing two successive instructions of an application being processed when an interrupt request occurs to process another application. An intermediate state reached by the current task is saved when the interrupt request occurs, and a counter for each of the processors indicating a number of instructions processed by each of the processors is maintained. A processor is caused to issue a synchronization confirmation in response to a comparison result that the numbers of instructions processed are identical. The processor is caused to enter a wait state when its number of processed-instructions is the largest among the processors or to execute a procedure for processing the instructions until its processed-instruction counter reaches the largest number.

4 Claims, 3 Drawing Sheets

PROCESS FOR MAINTAINING EXECUTION SYNCHRONIZATION BETWEEN SEVERAL ASYNCHRONOUS PROCESSORS WORKING IN PARALLEL AND IN A REDUNDANT MANNER

RELATED APPLICATIONS

The present application is based on, and claims priority from, French Application Number 07 01033, filed Feb. 13, 2007, the disclosure of which is hereby incorporated by reference herein in its entirety.

BACKGROUND OF THE INVENTION

The present invention relates to computers used in critical applications where it is important to be able to guarantee the integrity of the data produced. It applies to redundant computers with several parallel computing units monitored by a circuit based on comparison or majority voting. The parallel computing units include processors which are independent of each other, running, in parallel and at the same speed but under the control of independent and therefore asynchronous clocks, the same applications parameterized with the same initial data, while the comparison or majority voting circuit only allows the output of data which are found to be identical or of which a majority are found to be identical in the various parallel channels.

Implementing the redundancy principle involves comparing the results supplied by the processors in the various computing units for the same processing stage in the same application with the same initial parameterization. In order to achieve this, the processors in the different computing units are programmed to run the same application in parallel, at the same speed and with the same parameterization. Due, however, to the independence of their clocks and the asynchronous processing of interrupts, they have a natural tendency to become desynchronized and this must be compensated for by an appropriate level of relaxed synchronization.

The complexity of modern processors, the fact that they take into account variable-length instructions from a queue held in cache memory and the difficulties engendered by processing interrupt requests formulated asynchronously relative to the execution of instruction sequences in an application make it difficult to achieve synchronization by predicting the states of the microprocessors at a given instant solely on the basis of knowing the sequence of instructions in the application that is running, its initial parameterization and the time elapsed since execution began.

U.S. Pat. No. 5,896,523 teaches that it is possible to circumvent this problem by making use of a programmable instruction counter in the processors in order to periodically resynchronize processors running in parallel the same application parameterized with the same initial data by making them execute, at the end of a time interval approximately corresponding to the processing time for a predefined number or quantum of instructions, a synchronization procedure based on the number of instructions processed appearing in the instruction counters and called by means of a synchronization interrupt request. When the synchronization interrupt request is accepted by a processor, the synchronization procedure results in the following:

the processor concerned signals to the other processors the contents of its processed-instruction counter;
the processor concerned compares the number of instructions processed appearing in the instructions-processed counters from the various processors after they accepted the synchronization interrupt; and
if the numbers of instructions processed are found to be identical,
the processor concerned issues a synchronization confirmation;
while if the numbers of instructions processed are different,
either the processor concerned enters a wait state if its processed-instruction counter indicates the largest number and the comparison is repeated for each new exchange of numbers of instructions-processed counters with the other processors,
or the processor concerned executes a procedure of processing the instructions step-by-step until its processed-instruction counter reaches the highest number and then the processor concerned sends to the other processors an updated value of its number of instructions processed, with renewal of the comparison.

This relaxed synchronization process between the redundant processors of a fault-tolerant computer does not respond to the severe operating security constraints of a multi-tasking time-sharing computer intended for use in avionics, which has to be deterministic and ensure strict compliance with the time slices allocated to the various applications. There is indeed no reason why the time slices allocated to the various applications should correspond to the same quantum of instructions hence it does not guarantee synchronization of the processors at the end of each time slice at the time of saving the context of the provisional end of processing of the application the execution of which is to be interrupted. Furthermore, systematic resynchronization at each quantum of instructions processed does not follow the increasing risk of desynchronization suffered by the redundant processors in the computer on interrupt requests by system calls. In addition, to ensure good synchronization this technique will generate a number of synchronizations which is systematically greater than that strictly necessary, with a consequent reduction in the performance available for applications.

SUMMARY OF THE INVENTION

The purpose of the invention is to provide a remedy for the above-mentioned disadvantages.

The subject of the invention is a process for maintaining synchronization, within a computer with parallel processing units, between the processors of the processing units, said processors interrupting their current task between the processing two successive instructions after an interrupt request occurs, in order to begin, after saving the intermediate state reached by the interrupted task, a new process designated in the interrupt request, including counters of instructions processed apart from interrupts, and executing the same applications in parallel at the same speed but in an asynchronous manner under the control of a common multi-tasking operating system which manages the resources of the computer by system calls triggering software interrupts, sharing time in successive slices of which each is allocated to processing an application, sharing being performed by means of timing interrupt requests issued by the operating system at the end of a time slice in order to cause an application change process to be executed with saving of the intermediate state reached by the interrupted application and restoration of the last intermediate state of the new application in question, and with resynchronization of the processed-instruction counters of the various processors, said process using a synchronization procedure called by a synchronization interrupt request issued by the operating system to all the processors causing, when it is executed by a processor:

signalling by the processor concerned to the other processors the contents of its processed-instruction counter;
   reading of the contents of the processed-instruction counters of the other processors;
   comparison by the processor concerned of the numbers of instructions processed appearing in processed-instruction counters of the various processors after they accepted the synchronization interrupt, and
   if the numbers of instructions processed are found to be identical,
      the processor concerned issues a synchronization confirmation;
   while if the numbers of instructions processed are different,
      either the processor concerned enters a wait state if its processed-instruction counter indicates the largest number and the comparison is repeated for each new exchange of numbers of instructions processed with the other processors;
      or the processor concerned executes a procedure of processing the instructions step-by-step until its processed-instruction counter reaches the highest number and then the processor concerned sends to the other processors an updated value of its number of instructions processed, with renewal of the comparison,
   said process being notable in that the synchronization procedure is activated by the operating system by means of a synchronization interrupt request issued to all the processors, at the beginning of the processing of each timing interrupt marking the end of a time slice and of each system call generated by an application.

Advantageously, a processor, when it is in a wait state exceeding a certain duration, causes a reset of all the processors.

Advantageously, a processor executing the synchronization procedure following a system call generated by an application or following the detection of a hardware or software error causes a reset of all the processors if at the same time one of the other processors has an processed-instruction counter indicating a number greater than that of its own processed-instruction counter.

Advantageously, a processor executing the synchronization procedure causes a reset of all the processors if at the same time one of the other processors is processing an interrupt request in connection with a hardware or software error and if, on completion of the synchronization procedure, the processors do not all converge on an identical error situation.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DESCRIPTION OF THE PREFERRED EMBODIMENTS

Figure 1:
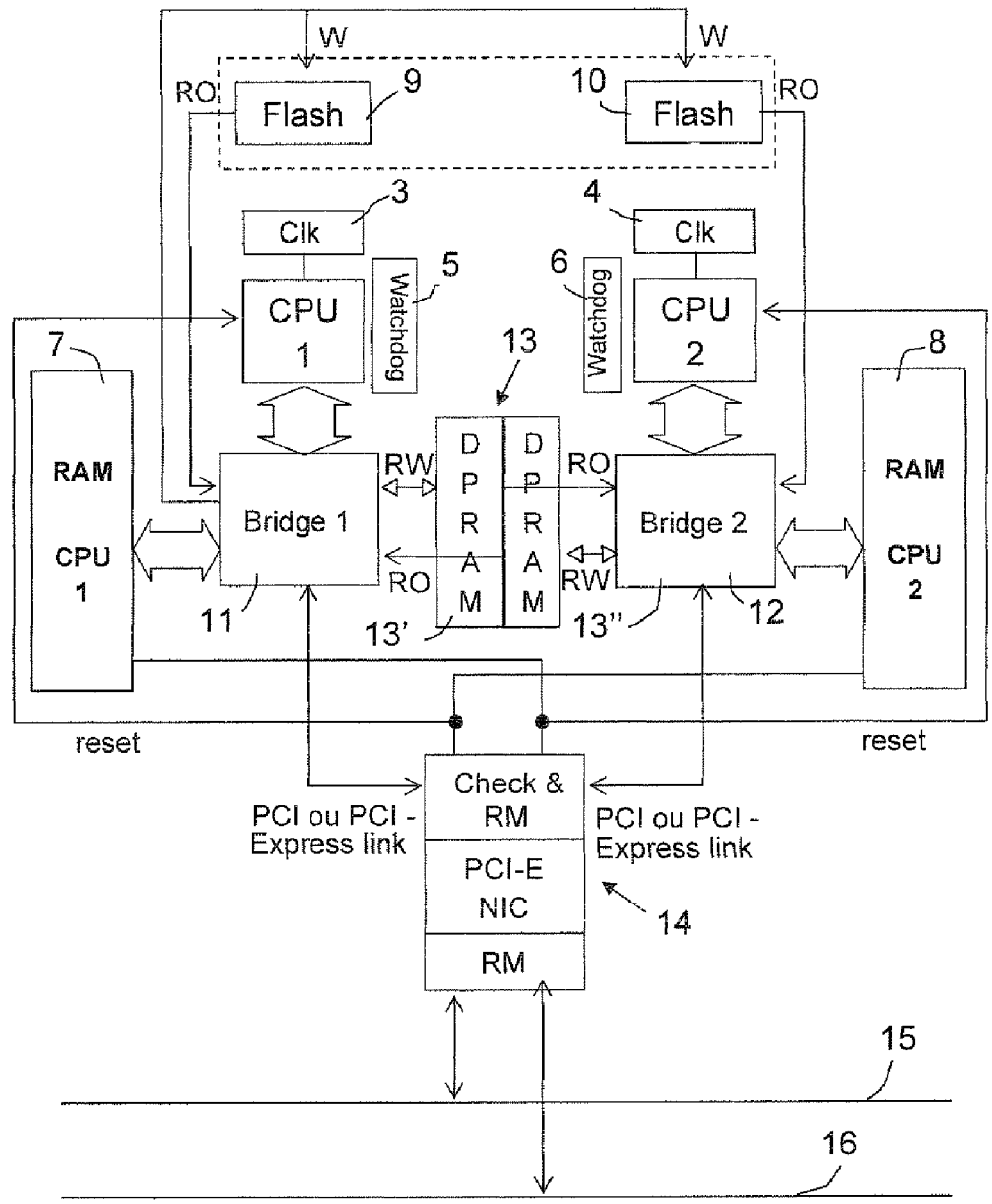
FIG. 1 is a schematic representation of the architecture of a redundant computer with two parallel processing channels.

FIG. 1 details the architecture of a computer with a high level of reliability and safety designed to be installed on an aircraft. The computer has two parallel and redundant processing units, a DPRAM 13 dual-ported random-access memory shared between the two processing units and a bus controller 14 giving access to two external communications buses extending redundancy beyond the computer.

Each processing unit includes:
   a processor 1, 2 associated with an individual clock 3, 4 and an individual watchdog circuit 5, 6 monitoring correction operation,
   RAM working memory 7, 8,
   flash program memory 9, 10,
   a bridge 11, 12 controlling data transfers between: the processors 1 and 2, the working memories 7 and 8 and programme memories 9 and 10 of the unit to which the processor 1, 2 belongs, the dual-ported random access memory DPRAM 13 shared between the two processing units and the bus controller 14.

More precisely, the bridge 11, 12 of a processing unit gives the processor 1, 2 of the processing unit to which it belongs:
   read and write access to the RAM working memory 7, 8 of the unit;
   read-only access to the program memories 9, 10 of the unit, one of the processors 1 having write access to both program memories 9, 10 in order to allow the programs for execution to be loaded;
   read and write access to a reserved part 13', 13" of the dual-ported random access memory DPRAM 13 and read-only access to the remainder 13", 13';
   read access to data input registers in the bus controller 14, and
   write access to the data output registers in the bus controller 14.

The bus controller 14 is connected to the bridges 11 and 12 of the two processing units by a local bus, for example a bus meeting the PCI (Peripheral Component Interconnect) or PCI Express standard. In the transmission direction, it verifies that processors 1 and 2 of the two processing units place two identical versions of the same data in their data output registers then formats the data to be transmitted for duplicated transmission on the two redundant external buses 15, 16. In the reception direction it verifies that data received for the computer on an external bus 15 or 16 are also received on the other external bus 16 or 15, formats the data so that they can be handled by the processing units of the computer then places identical data in its data input registers to make them available to the processors 1 and 2 in the two processing units.

The program memories 9, 10 have identical contents and the clocks 3, 4 have the same frequency in order to enable the processors 1, 2 of the two redundant processing units in the computer to run, in parallel and at the same speed, but asynchronously due to the independence of their clocks 3, 4, identical tasks belonging to the same applications. These processors 1, 2 run under the control of the same multi-tasking time-sharing operating system, which is duplicated in the program memories 9, 10 and performs for each processing unit the management of hardware resources and the allocation of a specific slice of processor time, periodically renewed, to each of the applications to be executed.

Figure 2:
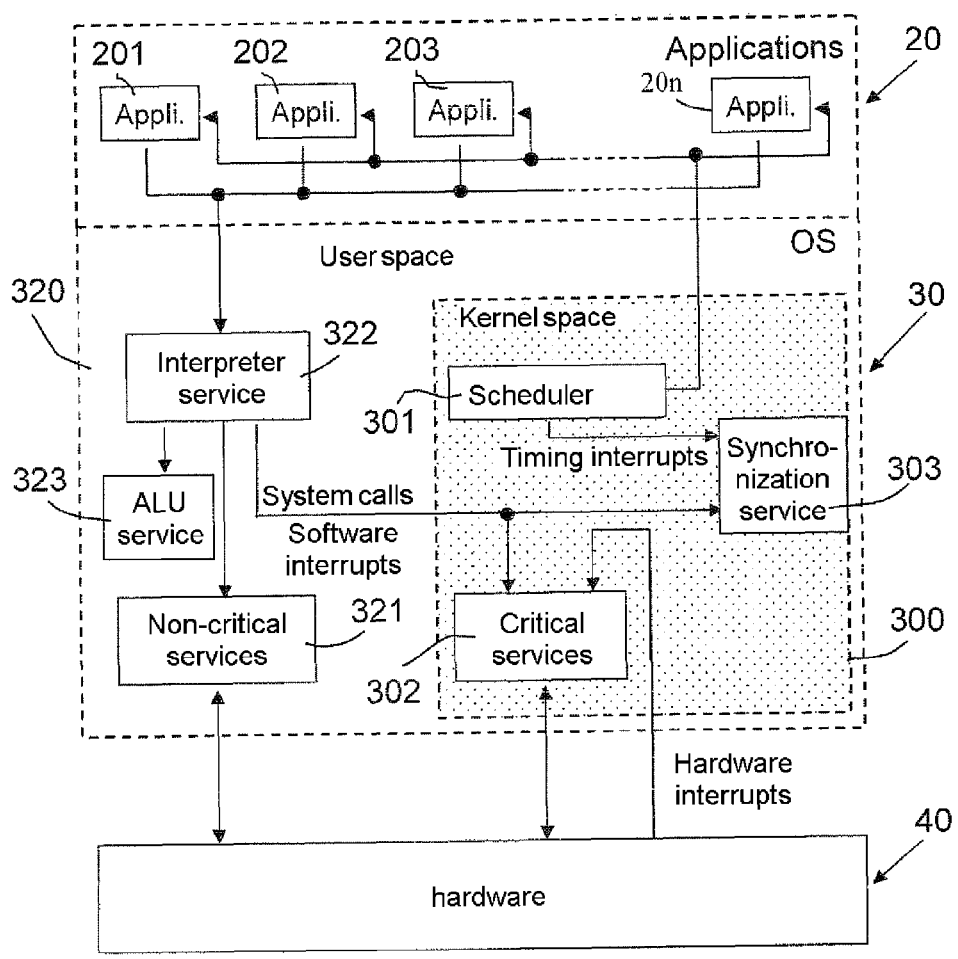
FIG. 2 is a diagram detailing the structure in superimposed software layers of the programming of a processor in one processing channel.

Programming is conventionally structured in superimposed abstraction layers such as those illustrated in FIG. 2.

The most peripheral abstraction layer is the applications space 20. In order to access the resources of the processor and peripheral equipments referred to collectively as hardware 40, it uses the services of a real-time multi-tasking operating system 30 structured in two sublayers, a kernel or supervisor space 300 and a user space 320.

The operating system kernel space 300 contains a scheduler 301 which manages the time slices allocated to each application 201 to 20n by means of software timing interrupts activating context-switching processes, and critical services which involve the use of resources to which direct access is not permitted and which are only available through system calls generating software interrupts.

The user space 320 contains all the other services 321 whose execution does not require the use of software interrupts, notably the interpreter service 322 that translates the application language into machine language and the ALU service 323 that manages the logic and arithmetic resources of the processor.

The hardware 40 that exchanges data with the critical and non-critical services of the operating system 30 also generates hardware interrupts processed by the critical services of the kernel space 300 of the operating system 30 when it is necessary to react in real time to events that are asynchronous with respect to applications processing.

The use of redundancy involves comparing only data produced in parallel by the two processing units of the computer for the same phase of a running process, whereas the data are not necessarily available at the same instant at the outputs of the two processing units, due to corresponding drifting between the clocks 3, 4 of the processors 1, 2 and to problems caused by the processing of interrupts, whose acceptance by a processor 1, 2 depends on its activity at that instant and of which some may only concern one of the two processing units.

In order to provide a remedy for the tendency of the two processing units to desynchronize due to corresponding drifting between the clocks 3, 4 and to the problems arising from interrupt processing, resynchronization of the processors 1, 2 is performed when the context is saved at the end of each time slice devoted to processing an application. This resynchronization is based on the one hand on the presence in modern processors of an processed-instruction counter, which is programmable and programmed so as to ignore the instructions corresponding to interrupt processing, and on the other hand on a synchronization service 303 in the kernel space 300 of the operating system, called by a synchronization interrupt request issued before each timing interrupt request.

Figure 3:
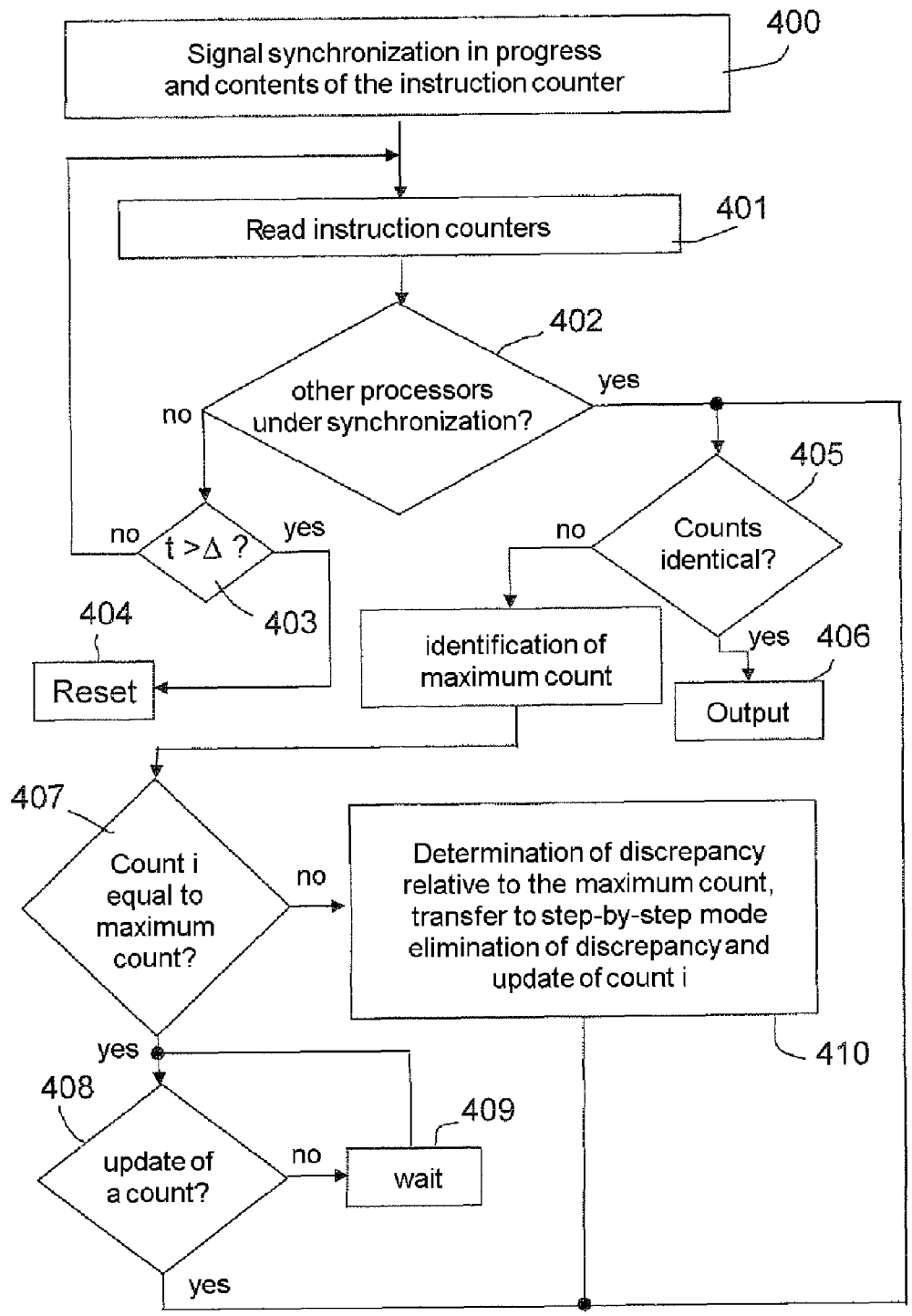
FIG. 3 is a flowchart showing the various stages in a synchronization process used in the process according to the invention.

As shown in FIG. 3, the synchronization service 303 causes the processor which issued the synchronization interrupt request to execute the following sequence of operations:

signalling at 400, by the processor concerned and for the attention of the other processor, through specific registers in the DPRAM dual-ported memory 13, of the acceptance of a synchronization interrupt and of the number contained in its processed-instruction counter reading at 401, in specific registers in the DPRAM dual-ported memory 13, of the number communicated by the other processor as corresponding to the contents of its own processed-instruction counter observation at 402 of the acceptance or not of an interrupt by the other processor, with the type of interrupt concerned if a synchronization interrupt is not accepted by the other processor, a wait at 403 for an acceptance of the synchronization interrupt by the other processor with loopback to the previous stage and issue at 404 of a command to reset the two processors 1, 2 if a certain waiting time is exceeded if the other processor accepts a synchronization interrupt, comparison by the processor concerned of the contents of its processed-instruction counter with the contents of the processed-instruction counter of the other processor, and in the event of the observation at 405 that the numbers of instructions processed are identical,
issue by the processor concerned of a synchronization confirmation and termination at 406 of the processing of the synchronization interrupt, while in the event of the observation at 405 of different numbers of instructions processed, after identification at 407 of the largest number of instructions processed
either, if the processed-instruction counter of the processor concerned indicates the largest number, setting of the processor concerned (408, 409) to wait for an update of the number communicated by the other processor,
or execution at 410, by the processor concerned, of a procedure for processing the instructions step-by-step until its processed-instruction counter reaches the number of instructions processed communicated by the other processor, then updating by the processor concerned of the register of the DPRAM dual-ported memory 13 allocated to its number of instructions processed and repetition of the comparison.

This synchronization process is easily extended to a number of processing units greater than two, as in redundant computers with majority voting. In these cases each processor whose processed-instruction counter does not reach the observed maximum number eliminates the discrepancy in step-by-step mode then waits, in the same way as the processor having indicated the largest number of instructions processed, for updates of the different counts showing that they have all reached the largest number. A time limit may be defined for these operations to return to synchronization with, for example, a general reset of all the processors if the time limit is exceeded.

In the example described, a synchronization interrupt is inserted at the commencement of processing of each timing interrupt so as to activate the synchronization service before each context switch occurring at the end of time slices organised by the scheduler 301, which allows the synchronization of the processing units to be consolidated at the important moments of context saving at the momentary end of execution of the applications. In order to further improve the reliability of a computer with redundant processing units, synchronization interrupts are also inserted at the beginning of processing operations corresponding to system calls generated by the applications. This results in consolidation of synchronization when the processing units access the hardware (shared memory, communications bus, etc.).

It is also possible to take into consideration, during processing of a synchronization interrupt by a processor, the possible processing of other types of interrupt by one or more of the other processors. In order to achieve this, the synchronization procedure executed by the synchronization service 303 has its stage 402 for the observation of the acceptance of a synchronization interrupt by the other processors completed by a context analysis leading to a reset of all the processors if:

a synchronization interrupt is caused by a system call or a hardware or software error and if one of the other processors indicates in its processed-instruction Counter a number greater than that indicated by the processed-instruction counter of the processor which performed the system call, any one of the interrupts corresponds to a hardware or software error context and if, on completion of the synchronization process (authorising step-by-step execution of the instructions of the application when a timing interrupt has already been accepted) the processors do not all converge on an identical error.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A process for maintaining synchronization, in a computer with parallel processing units, between processors of the processing units in which all the processors are executing a same plurality of applications in parallel and at the same speed but in an asynchronous manner under a control of a common multi-tasking operating system, the process comprising:

interrupting, by each of the processors, a current task between processing two successive instructions of an application being processed when an interrupt request occurs to process another application;

saving an intermediate state reached by the current task when the interrupt request occurs;

maintaining a counter for each of the processors indicating a number of instructions processed by each of the processors apart from process instructions;

managing the resources of the computer by system calls generated by the plurality of applications, wherein the system calls trigger software interrupts;

sharing time in successive time slices of which each is allocated to processing an application from the plurality of applications, wherein sharing is performed by timing interrupt requests issued by the common multi-tasking operating system to each processor at the end of a time slice in order to cause a change process from a current application to another application to be executed, the change process comprising saving of the intermediate state that was reached by the current application when interrupted and restoration of a last intermediate state that was saved for another application to be executed with resynchronization of the processed-instruction counters of the processors;

maintaining synchronization using a synchronization procedure called by a synchronization interrupt request issued by the common multi-tasking operating system to all the processors;

signaling by a processor to other processors a number of processed instructions contained in its processed-instruction counter;

comparing the number of processed instructions contained in its processed-instruction counter with the numbers of processed instructions contained in the processed-instruction counters of the other processors after they accepted the synchronization interrupt;

causing the processor to issue a synchronization confirmation in response to a comparison result that the numbers of instructions processed are identical; and causing the processor to enter a wait state when its number of processed-instructions is the largest of the numbers of instructions processed that are compared and the comparison is repeated for each new exchange of numbers of instructions processed with the other processors, or causing the processor to execute a procedure for processing the instructions step-by-step until its processed-instruction counter reaches the largest number and then the processor sends to the other processors an updated value of its number of instructions processed, with renewal of the comparison;

wherein the synchronization procedure is activated at the beginning of the processing of each timing interrupt generated by the common multi-tasking operating system at the end of a time slice and of each system call generated by an application.

2. The process according to claim 1, further comprising causing a reset of all the processors after one of the processors being in the wait state exceeding a certain duration.

3. The process according to claim 1, further comprising causing a reset of all the processors if one of the processors is executing the synchronization procedure following a system call generated by an application or following detection of a hardware or software error, and another one of the processors is processing a timing interrupt request with a processed-instruction counter indicating a number greater than that of a processed-instruction counter of the another one of the processors.

4. The process according to claim 1, further comprising causing a reset of all the processors if one of the processors is executing the synchronization procedure and another one of the processors is processing an interrupt request in connection with a hardware or software error and if, on completion of the synchronization procedure, the processors do not all converge on an identical error situation.

* * * * *